United States Patent
Lee

(10) Patent No.: US 9,863,430 B2
(45) Date of Patent: Jan. 9, 2018

(54) COOLING UNIT OF AIR COMPRESSOR FOR FUEL CELL VEHICLE

(71) Applicant: Hyundai Motor Company, Seoul (KR)

(72) Inventor: Changha Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 372 days.

(21) Appl. No.: 14/556,109

(22) Filed: Nov. 29, 2014

(65) Prior Publication Data

US 2016/0032931 A1    Feb. 4, 2016

(30) Foreign Application Priority Data

Jul. 29, 2014  (KR) ........................ 10-2014-0096511

(51) Int. Cl.

| | |
|---|---|
| *F04D 25/08* | (2006.01) |
| *F04D 17/10* | (2006.01) |
| *F04D 25/06* | (2006.01) |
| *F04D 29/58* | (2006.01) |
| *F04D 29/42* | (2006.01) |
| *H01M 8/04007* | (2016.01) |

(52) U.S. Cl.
CPC ........... *F04D 25/082* (2013.01); *F04D 17/10* (2013.01); *F04D 25/0606* (2013.01); *F04D 29/4206* (2013.01); *F04D 29/584* (2013.01); *F04D 29/5806* (2013.01); *F04D 29/5826* (2013.01); *H01M 8/04007* (2013.01); *H01M 2250/20* (2013.01); *Y02T 90/32* (2013.01)

(58) Field of Classification Search
CPC .... F04D 17/10; F04D 25/0606; F04D 25/082; F04D 29/4206; F04D 29/5806; F04D 29/5826; F04D 29/584; H01M 2250/20; H01M 8/04007; Y02T 90/32
USPC ........ 417/367, 366, 368; 310/52, 54, 57, 58, 310/62, 63
See application file for complete search history.

(56) References Cited

U.S. PATENT DOCUMENTS

| | | | | |
|---|---|---|---|---|
| 1,852,476 | A * | 4/1932 | Pfleger | ...................... H02K 9/06 310/57 |
| 2,245,334 | A * | 6/1941 | Fredlund | ................. A47L 5/362 310/57 |
| 2,294,586 | A * | 9/1942 | Troller | .................. F04D 25/082 310/63 |
| 2,480,095 | A * | 8/1949 | Buchi | ....................... F01D 5/04 415/110 |

(Continued)

FOREIGN PATENT DOCUMENTS

| | | |
|---|---|---|
| KR | 10-2013-0057900 A | 6/2013 |
| KR | 10-1324226 B1 | 10/2013 |

*Primary Examiner* — Devon Kramer
*Assistant Examiner* — Benjamin Doyle
(74) *Attorney, Agent, or Firm* — Mintz Levin Cohn Ferris Glovsky and Popeo, P.C.; Peter F. Corless

(57) ABSTRACT

An air compressor for a fuel cell vehicle includes a volute housing, an impeller mounted to the volute housing, and a motor driving the impeller and cooling the motor and bearings that support a rotation shaft of the motor using air at an outlet side of the impeller. The air compressor has a cooling unit including: a coolant channel provided in plural along a radial direction in a motor housing that is coupled to the volute housing and through which a coolant flows; and a cooled air channel formed between coolant channels of the motor housing and through which the air flows.

10 Claims, 4 Drawing Sheets

(56) References Cited

U.S. PATENT DOCUMENTS

| | | | | |
|---|---|---|---|---|
| 2,494,200 A * | 1/1950 | Ramqvist | ............... | H02K 9/06 310/52 |
| 2,556,435 A * | 6/1951 | Moehrl | ............... | F04D 29/061 310/157 |
| 2,662,478 A * | 12/1953 | Surre | ............... | F04B 43/009 116/276 |
| 2,787,720 A * | 4/1957 | Ethier | ............... | H02K 9/18 310/57 |
| 2,829,286 A * | 4/1958 | Britz | ............... | H02K 5/10 310/53 |
| 2,830,541 A * | 4/1958 | Higgins | ............... | F04D 29/0413 384/115 |
| 2,844,101 A * | 7/1958 | Burns | ............... | H02K 5/128 310/54 |
| 3,267,868 A * | 8/1966 | Page | ............... | F04D 29/043 310/54 |
| 3,306,074 A * | 2/1967 | Wilson | ............... | F25B 31/002 310/64 |
| 3,643,119 A * | 2/1972 | Lukens | ............... | H02K 9/06 310/60 R |
| 3,653,785 A * | 4/1972 | Dahlgren | ............... | H02K 9/19 165/104.31 |
| 3,748,507 A * | 7/1973 | Sieber | ............... | H02K 9/14 310/58 |
| 3,804,202 A * | 4/1974 | Funke | ............... | F04B 39/0246 184/6.16 |
| 3,960,467 A * | 6/1976 | Zsuppan | ............... | F04D 13/086 310/64 |
| 3,980,912 A * | 9/1976 | Panza | ............... | H02K 5/24 181/202 |
| 4,006,602 A * | 2/1977 | Fanberg | ............... | F04B 39/06 415/178 |
| 4,065,233 A * | 12/1977 | Torigoe | ............... | F04D 29/441 415/208.3 |
| 4,225,292 A * | 9/1980 | Hallerback | ............... | F04D 29/5806 417/367 |
| 4,362,020 A * | 12/1982 | Meacher | ............... | F01D 25/22 290/52 |
| 4,644,202 A * | 2/1987 | Kroy | ............... | F04D 13/0666 277/412 |
| 4,742,257 A * | 5/1988 | Carpenter | ............... | H02K 9/14 310/57 |
| 5,019,737 A * | 5/1991 | Bruno | ............... | F28F 1/16 310/52 |
| 5,181,834 A * | 1/1993 | Ikeda | ............... | F04B 39/04 184/6.17 |
| 5,248,245 A * | 9/1993 | Behnke | ............... | F04D 29/061 415/110 |
| 5,250,863 A * | 10/1993 | Brandt | ............... | F04D 29/588 310/54 |
| 5,448,118 A * | 9/1995 | Nakamura | ............... | H02K 5/20 310/54 |
| 5,549,447 A * | 8/1996 | Bevington | ............... | F04D 13/0646 415/115 |
| 5,616,973 A * | 4/1997 | Khazanov | ............... | H02K 5/20 310/54 |
| 5,641,275 A * | 6/1997 | Klein | ............... | F04D 29/0413 415/176 |
| 5,767,602 A * | 6/1998 | Sargeant | ............... | H02K 5/04 310/216.124 |
| 5,780,946 A * | 7/1998 | Nakamura | ............... | F04D 25/082 310/58 |
| 5,789,833 A * | 8/1998 | Kinoshita | ............... | B61C 9/50 310/58 |
| 5,847,479 A * | 12/1998 | Wang | ............... | F16C 17/107 310/90 |
| 5,859,482 A * | 1/1999 | Crowell | ............... | H02K 5/20 310/54 |
| 5,893,706 A * | 4/1999 | Kawaguchi | ............... | F04B 27/0895 184/104.1 |
| 5,904,471 A * | 5/1999 | Woollenweber | ............... | F02B 37/16 417/307 |
| 5,930,852 A * | 8/1999 | Gravatt | ............... | F04D 13/06 4/493 |
| 6,095,766 A * | 8/2000 | Brown | ............... | F03C 1/0671 415/111 |
| 6,102,672 A * | 8/2000 | Woollenweber | ............... | F04D 25/082 417/366 |
| 6,129,524 A * | 10/2000 | Woollenweber | ............... | F04D 17/12 417/366 |
| 6,173,758 B1 * | 1/2001 | Ward | ............... | F28F 3/022 165/185 |
| 6,190,123 B1 * | 2/2001 | Wunderwald | ............... | F04D 29/051 415/1 |
| 6,200,108 B1 * | 3/2001 | Caudill | ............... | F04D 13/06 165/47 |
| 6,404,628 B1 * | 6/2002 | Nagashima | ............... | H05K 7/20927 165/104.33 |
| 6,579,078 B2 * | 6/2003 | Hill | ............... | F04D 17/122 417/228 |
| 6,700,237 B1 * | 3/2004 | Yang | ............... | H02K 9/26 165/47 |
| 6,774,514 B2 * | 8/2004 | Matsuoka | ............... | H02K 5/1732 310/52 |
| 6,903,471 B2 * | 6/2005 | Arimitsu | ............... | B60K 6/445 310/113 |
| 6,909,210 B1 * | 6/2005 | Bostwick | ............... | H02K 5/20 310/254.1 |
| 6,997,686 B2 * | 2/2006 | Agrawal | ............... | F04D 17/12 417/250 |
| 7,028,385 B2 * | 4/2006 | Radomile | ............... | H02K 1/32 29/557 |
| 7,063,519 B2 * | 6/2006 | Agrawal | ............... | F04D 25/06 417/365 |
| 7,091,635 B1 * | 8/2006 | Gilliland | ............... | F04D 29/282 310/62 |
| 7,108,488 B2 * | 9/2006 | Larue | ............... | F16C 17/024 384/103 |
| 7,193,342 B2 * | 3/2007 | Casey | ............... | H02K 1/20 310/54 |
| 7,347,674 B2 * | 3/2008 | Terry | ............... | F04D 29/20 417/367 |
| 7,425,119 B2 * | 9/2008 | Bolz | ............... | F02B 33/40 123/559.1 |
| 7,629,717 B2 * | 12/2009 | Kanei | ............... | H02K 9/08 310/64 |
| 7,633,193 B2 * | 12/2009 | Masoudipour | ............... | H02K 9/19 310/54 |
| 7,737,585 B2 * | 6/2010 | Bahr | ............... | H02K 5/20 310/52 |
| 7,841,187 B2 * | 11/2010 | Behaghel | ............... | F01D 5/046 415/115 |
| 7,942,646 B2 * | 5/2011 | Zhou | ............... | F04D 25/082 310/156.11 |
| 7,988,426 B2 * | 8/2011 | Elpern | ............... | F01D 25/125 415/112 |
| 8,087,249 B2 * | 1/2012 | Ottaviano | ............... | F02C 3/08 60/726 |
| 8,215,928 B2 * | 7/2012 | Agrawal | ............... | F04D 29/057 415/178 |
| 8,508,085 B2 * | 8/2013 | Bradfield | ............... | H02K 1/20 310/52 |
| 8,616,831 B2 * | 12/2013 | Wollstadt | ............... | F04D 17/10 29/888.02 |
| 8,803,381 B2 * | 8/2014 | Lepres | ............... | H02K 5/20 310/58 |
| 8,959,950 B2 * | 2/2015 | Doty | ............... | F04D 29/284 417/366 |
| 9,003,793 B2 * | 4/2015 | Begin | ............... | F02B 47/08 415/177 |
| 9,030,064 B2 * | 5/2015 | Haga | ............... | H02K 9/14 310/59 |
| 9,200,643 B2 * | 12/2015 | Gilarranz | ............... | F04D 25/0606 |
| 9,476,428 B2 * | 10/2016 | Agrawal | ............... | F04D 25/024 |
| 9,482,240 B2 * | 11/2016 | Gerard | ............... | F04D 1/00 |
| 9,768,667 B2 * | 9/2017 | Randria | ............... | H02K 9/06 |
| 2003/0222519 A1 * | 12/2003 | Bostwick | ............... | H02K 9/19 310/58 |

(56) References Cited

U.S. PATENT DOCUMENTS

| | | | |
|---|---|---|---|
| 2004/0150270 A1* | 8/2004 | Nagayama | H02K 1/32 310/61 |
| 2004/0219401 A1* | 11/2004 | Hobmeyr | H01M 8/04097 429/415 |
| 2005/0023909 A1* | 2/2005 | Cromas | H02K 9/12 310/58 |
| 2005/0235672 A1* | 10/2005 | Hsu | H02K 9/19 62/259.2 |
| 2009/0028730 A1* | 1/2009 | Radermacher | F04D 29/4206 417/423.8 |
| 2009/0261668 A1* | 10/2009 | Mantere | H02K 5/20 310/54 |
| 2011/0135519 A1* | 6/2011 | Cho | F04D 17/10 417/423.7 |
| 2011/0229351 A1* | 9/2011 | Beers | B64D 13/06 417/372 |
| 2012/0104884 A1* | 5/2012 | Wagner | H02K 1/32 310/54 |
| 2012/0107143 A1* | 5/2012 | Gilarranz | F04D 25/0606 417/53 |
| 2015/0308456 A1* | 10/2015 | Thompson | F04D 29/5806 417/244 |

* cited by examiner (a)

(b)

COOLING UNIT OF AIR COMPRESSOR FOR FUEL CELL VEHICLE

CROSS-REFERENCE TO RELATED APPLICATION

This application claims under 35 U.S.C. §119(a) priority to and the benefit of Korean Patent Application No. 10-2014-0096511 filed in the Korean Intellectual Property Office on Jul. 29, 2014, the entire contents of which are incorporated herein by reference.

BACKGROUND (a) Field of the Invention

The present invention relates to a fuel cell vehicle, more particularly, to a cooling unit of an air compressor applied to a fuel cell system of a fuel cell vehicle.

(b) Description of the Related Art

In general, a fuel cell vehicle is provided with a fuel cell system that is a power supply for driving a driving motor to generate electrical energy by an electrochemical reaction between hydrogen and air by a fuel cell.

The fuel cell system includes a stack in which fuel cells are stacked, a hydrogen supply system which supplies hydrogen to the stack, an air supply system which supplies air to the stack, and a cooling system which cools heat generated from the stack.

In particular, the air supply system includes an air compressor which compresses air and supplies the compressed air to the stack, and a humidifier which humidifies the compressed air using moisture generated at the stack.

However, a temperature of the air compressed by the air compressor under a high power operational condition of the stack is raised to about 100 to 150° C. due to a high compression ratio and a large amount of air.

The temperature of the compressed air is higher than 60 to 80° C., which is a normal operational temperature of the stack, and thus acts as a disadvantageous condition to humidification efficiency of the humidifier and operational efficiency of the stack. Therefore, it is necessary for the fuel cell system to cool the high-temperature compressed air that is supplied to the humidifier by the air compressor.

In addition, it is very important to cool a motor rotating an impeller and a bearing that supports a rotation shaft of the motor for determination of performance and life-span of an entire device in a turbo-type air compressor that rotates with high-speed.

In case of the motor, a coil may be damaged or an insulation problem may occur if heat generated from a coil wire or a magnet of a rotor is not sufficiently cooled. In addition, a rare-earth-based magnet used in the motor may be weakened due to heat, and therefore the magnet also needs to be cooled.

Further, the motor of the air compressor needs a bearing for supporting the rotation shaft, and a reasonable temperature is set according to the type or a material of the bearing, and accordingly, the bearing also needs to be sufficiently cooled.

In general, the bearing and the motor are cooled by utilizing air at an outlet of the air compressor. In this case, the air at the outlet side has already been compressed with high temperature so that the bearing and the motor cannot be sufficiently cooled.

In particular, air at the outlet of the impeller is flown into the motor through a rear side of the impeller, and the air cools the bearing at the front side by flowing through an internal path and then sequentially cools the motor and the bearing at the rear side. After that, the air is exhausted to the rear side of circulated in the motor and then returned to an entrance of the impeller.

In this case, the air at the outlet side of the compressor is increased, although it may be different according to specifications of the compressor, over 100° C. when an outlet pressure exceeds 2 bar. In particular, in case of a grease-impregnated ball bearing in which an oil lubrication and cooling structure is not included, a reasonable temperature should not exceed 150° C. Thus, in a conventional art, a temperature of a cooling air is too high to cool the bearings and the motor.

The above information disclosed in this Background section is only for enhancement of understanding of the background of the invention and therefore it may contain information that does not form the prior art that is already known in this country to a person of ordinary skill in the art.

SUMMARY

According to the present invention, a cooling unit of an air compressor can cool air at an outlet of an impeller with a coolant and cool bearings and a motor using the cooled air.

A cooling unit of an air compressor including a volute housing, an impeller mounted to the volute housing, and a motor driving the impeller and cooling the motor and bearings that support a rotation shaft of the motor using air at an outlet side of the impeller according to an exemplary embodiment of the present invention may include: a plurality of coolant channels arranged along a radial direction in a motor housing that is coupled to the volute housing and through which a coolant flows; and a cooled air channel formed between the coolant channels of the motor housing and through which the air flows.

In addition, the air flowing along the cooled air channel may be cooled using the coolant flowing along the coolant channels, and the motor and the bearings may be cooled using the cooled air.

In the cooling unit of the air compressor according to the exemplary embodiment of the present invention, the coolant channel may include at least one coolant path formed in a forward/backward direction in the motor housing.

The cooled air channel may include: a first connection path formed in a front side of the motor housing coupled with the volute housing, and is connected with a rear side of the impeller; a first path connected with the first connection path and formed in from the front side to the rear side of the motor housing; a second path connected with a rear end of the first path and formed from a rear side to the a front side of the motor housing; and a second connection path connected with a front end of the second path and connected with the inside of the motor housing.

The cooled air channel may let the air flow into the motor housing through the first connection path, the first path, the second path, and the second connection path, and may exhaust the air through a rear side of the motor housing.

The cooled air channel may include: a connection path formed in a front side of the motor housing coupled with the volute housing, and is connected with a rear side of the impeller; a first path connected with the connection path and formed from a front side to a rear side of the motor housing; and a second path connected to a rear end of the first path and connected with the inside of the motor housing.

The cooled air channels may branch the air to a bearing at a front side and a bearing at a rear side from the inside of the motor housing.

The cooled air channel may exhaust the air branched to the rear side through the rear side of the motor housing.

A circulation path that circulates the air branched to the bearing at the front side toward the volute housing may be formed in the rotation shaft.

The cooled air channel may include: a first connection path formed in the front side of the motor housing coupled with the volute housing, and is connected with a rear side of the impeller; a first path connected with the first connection path and formed from a front side to a rear side of the motor housing; a second path connected with a rear end of the first path and formed from a rear side to a front side of the motor housing; a second connection path connected with a front end of the second path and connected with the inside of the motor housing; and a circulation path formed in the rotation shaft and circulating the air toward the volute housing.

According to the exemplary embodiment of the present invention, a coolant is circulated through coolant channels and air is supplied through the cooled air channels formed between the coolant channels so that a temperature of the air can be decreased using the coolant and the motor and the bearings can be cooled with the cooled air.

Accordingly, in the exemplary embodiment of the present invention, cooling performance of the air compressor with respect to the motor and the bearings can be more improved and durability of the air compressor can be improved through sufficiently cooling of the motor and the bearings.

A fuel cell vehicle according to the present invention preferably includes: an air compressor including a volute housing, an impeller mounted to the volute housing, and a motor driving the impeller and cools the motor and bearings that support a rotation shaft of the motor using air at an outlet side of the impeller; and a cooling unit including: a plurality of coolant channels provided along a radial direction in a motor housing that is coupled to the volute housing and through which coolant flows; and a cooled air channel formed between coolant channels of the motor housing and through which the air flows

BRIEF DESCRIPTION OF THE DRAWINGS

The drawings are provided for reference in describing exemplary embodiments of the present invention, and the spirit of the present invention should not be construed only by the accompanying drawings.

DETAILED DESCRIPTION OF THE EMBODIMENTS

Figure 1:
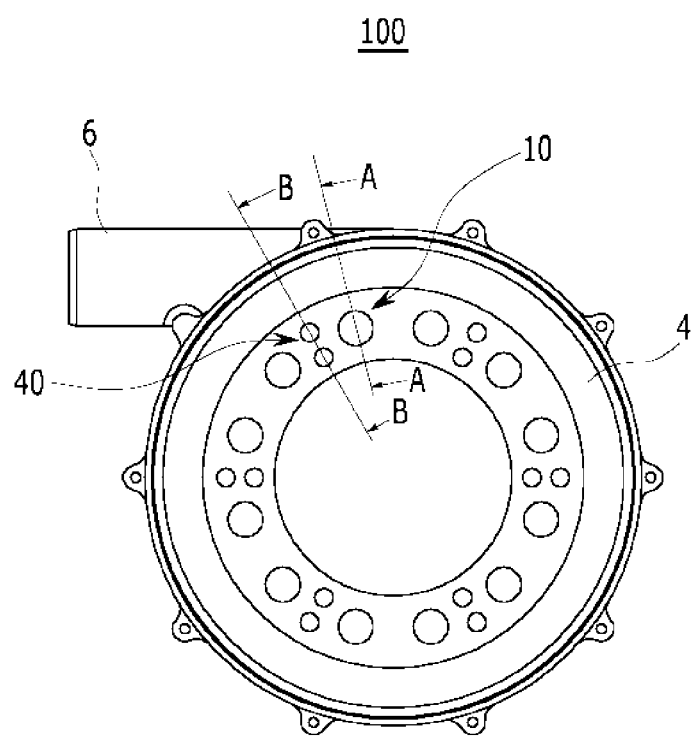
FIG. 1 shows a cooling unit of an air compressor according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

In addition, some of the components are called a first, a second, etc., throughout the detailed descriptions in an effort to distinguish such components from one another because they have the same configurations, but in the following description, such a sequence is not limiting.

Further, the terms "-unit", "-means", "-er", and "-member" described in the specification mean units for processing at least one function and operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 2:
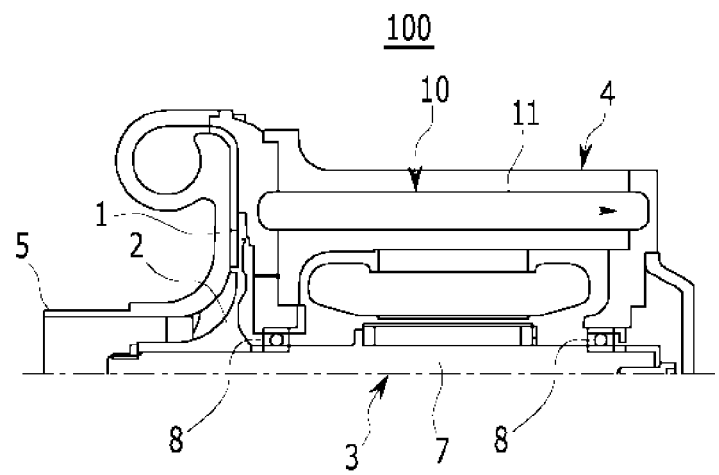
FIG. 2 (*a*) is a schematic cross-sectional diagram, taken along the line A-A of FIG. 1 and (*b*) is a schematic cross-sectional diagram, taken along the line B-B of FIG. 1.
Figure 2:
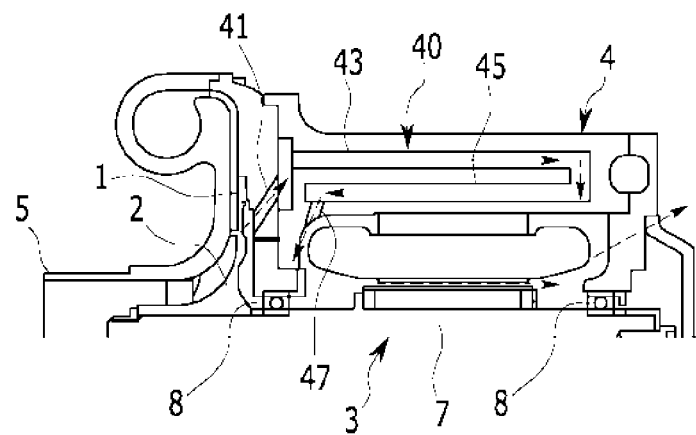

FIG. 1 shows a cooling unit of an air compressor according to an exemplary embodiment of the present invention, and FIG. 2 (*a*) is a schematic cross-sectional diagram, taken along the line A-A of FIG. 1 and (*b*) is a schematic cross-sectional diagram, taken along the line B-B of FIG. 1.

Referring to FIGS. 1 and 2, an air compressor according to an exemplary embodiment of the present invention may be applied to a fuel cell system generating electric energy from electrochemical reaction of hydrogen and air.

For example, the fuel cell system may be applied to a fuel cell vehicle that operates a driving motor as electric energy and operates wheels with a driving force of the driving motor.

Since the air compressor can be applied to an air supply system of the fuel cell system, the air compressor inhales and compresses air with rotation of an impeller and supplies the compressed air to a humidifier of the air supply system.

Such a fuel cell system is a method known to a person skilled in the air, and therefore no further description will be provided.

The air compressor according to the exemplary embodiment of the present invention is provided as a turbo-type air compressor and includes a volute housing 1, an impeller 2, a motor 3, and a motor housing 4.

The volute housing 1 is formed in a volute shape (also referred to as a vortex shape or a screw shape in the art), and includes an air inlet 5 and an air outlet 6 formed in an axial direction and a radial direction, respectively.

The impeller 2 is rotatably mounted in the volute housing 1 and provided between an air inlet path and a compressed-air outlet path.

The motor 3, as a driving source that rotates the impeller 2, is provided in the motor housing 4. The motor 3 is provided with a stator and a rotor, and a rotation shaft 7 is provided in the rotor and the impeller 2 is coupled to the rotation shaft 7.

In addition, the motor housing 4 receives the motor 3 and is coupled to a rear side of the impeller 2 of the volute housing 1. In this case, the rotation shaft 7 of the motor 3 is rotatably supported by the motor housing 4 through bearings at front and rear sides.

Thus, the air compressor receives air through the air inlet 5 of the volute housing as the impeller 2 rotates by the motor 3, compresses the inlet air, and exhausts the compressed air through the air outlet 6.

The air compressor may be formed in a general vehicle, a hybrid vehicle, an electric vehicle, and the like, and in the following description, the air compressor is exemplarily provided in a fuel cell system of a fuel cell vehicle.

However, it should be understood that the scope of the present invention is not limited thereto, and any air compressor that can be applied to various types and purposes of air supply structure is applicable.

The cooling unit 100 of the air compressor according to the exemplary embodiment of the present invention has a structure in which air at the outlet side of the impeller 2 is cooled using a coolant and the motor 3 and the bearing 8 are cooled using the cooled air.

For this, the cooling unit 100 of the air compressor according to the exemplary embodiment of the present invention basically includes a coolant channel 10 and a cooled air channel 40.

In particular, in the exemplary embodiment of the present invention, air flowing along the cooled air channel 40 is cooled using the coolant flowing along the coolant channel 10 and the motor 3 and the bearing 8 are cooled with the cooled air.

In the exemplary embodiment of the present invention, the coolant channel 10 is a flow path through which the coolant flows to the motor housing 4, and may be provided in plural along a radial direction of the motor housing 4. Preferably a plurality of the coolant channels 10 are provided. The coolant channels 10, as shown in (a) of FIG. 2, may include at least one coolant path 11 formed along forward and rearward directions in the motor housing 4.

In particular, the coolant flowing through the coolant channels 10 may be a coolant used in an electronic component cooling system of the fuel cell vehicle. The coolant may be supplied to the coolant channels 10 from a coolant reservoir through a coolant line.

In the exemplary embodiment of the present invention, the cooled air channel 40 is provided as a flow path for air at the outlet side of the impeller in the motor housing 4, and therefore, it may be provided between the respective coolant channels 10 in the motor housing 4.

The cooled air channel 40 is, as shown in (b) of FIG. 2, may be formed as a flow path connecting a first connection path 41, a first path 43, a second path 45, and a second connection path 47.

The first connection path 41 is formed at a front side of the motor housing 4 coupled with the volute housing 1, and is connected with a rear side (i.e., the outlet) of the impeller 2.

The first path 43 is connected with the first connection path 41, and is formed from a front side to a rear side of the motor housing 4. The second path 45 is connected with a rear end of the first path 43, and is formed from a rear side to a front side of the motor housing 4. The second path 45 may be connected with the rear end of the first path 43 along a thickness direction of the motor housing 4.

In addition, the second connection path 47 is connected with a front end of the second path 45 and connected to the inner side of the motor housing 4.

Such a cooled air channel 40 lets air at the outlet side of the impeller 2 flow into the motor housing 4 through the first connection path 41, the first and second paths 43 and 45, and the second connection path 47, and exhausts the air through the rear side of the motor housing 4.

Using the cooling unit 100 of the air compressor according to the exemplary embodiment of the present invention, compressed air is supplied to the humidifier when the fuel cell system is driven.

The air compressor inhales air through the air inlet 5 of the volute housing 1 through the impeller 2 rotating by the motor 3, compresses the inhaled air, and supplies the compressed to the humidifier by exhausting the same through the air outlet 6.

In such a process, in the exemplary embodiment of the present invention, a coolant of the electronic component cooling system is supplied to the coolant channels 10. Then, the coolant circulates along the coolant paths 11 of the coolant channels 10.

In addition, air at the outlet side of the impeller 2 is supplied to the cooled air channel 40 between the coolant channels 10.

The cooled air channel 40 lets air at the outlet side of the impeller 2 flow into the motor housing 4 through the first connection path 41, the first and second paths 43 and 45, and the second connection path 47, and exhausts the air to the outside through the rear side of the motor housing 4.

Thus, in the exemplary embodiment of the present invention, air flowing along the cooled air channel 40 is cooled using the coolant flowing along the coolant channel 10 and supplies the cooled air into the motor housing 4.

Then, the cooled air sequentially cools the bearing 8 at the front side, the motor 3, and the bearing 8 at the rear side in the motor housing 4 and then exhausted to the outside through the rear side of the motor housing 4.

Thus, in the exemplary embodiment of the present invention, the coolant is circulated to the coolant channels 10 and air is supplied to the cooled air channel 40 between the coolant channels 10 such that an air temperature is decreased by the coolant and the low-temperature cooled air cools the motor 3 and the bearing 8.

Accordingly, in the exemplary embodiment of the present invention, cooling performance with respect to the motor 3 and the bearing of the air compressor can be improved, and durability performance of the air compressor can be improved through sufficient cooling of the motor 3 and the bearing 8.

Figure 3:
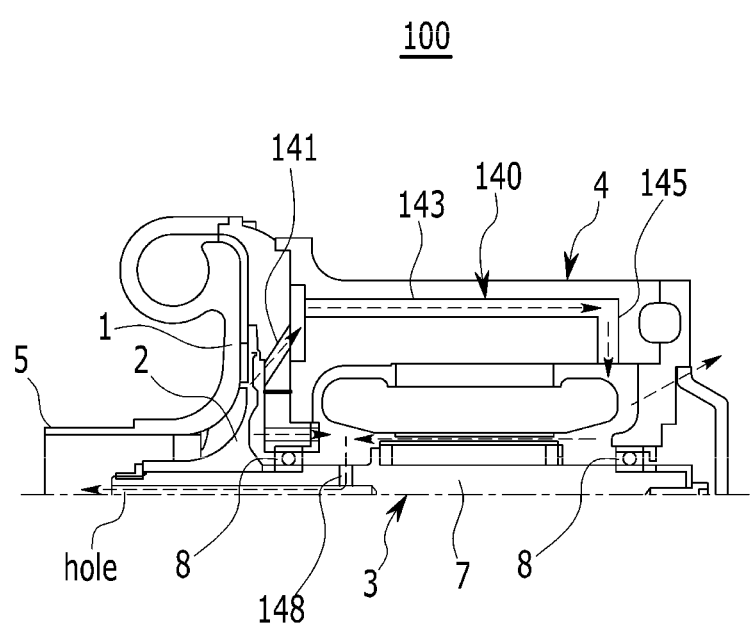
FIG. 3 is a first exemplary variation of a cooling air channel applied to the cooling unit of the air compressor according to the exemplary embodiment of the present invention.

FIG. 3 shows a first exemplary variation of the cooled air channel applied to the cooling unit of the air compressor according to the exemplary embodiment of the present invention.

Referring to FIG. 3, a cooled air channel 140 of the first exemplary variation according to the exemplary embodiment of the present invention branches and supplies air at the outlet side of the impeller 2 to the bearing 8 at the front side and the bearing 8 at the rear side in the motor housing 4.

Such a cooled air channel 140 includes a connection path 141, first and second paths 143 and 145, and a circulation path 148.

The connection path 141 is formed at the front side of the motor housing 4 coupled with a volute housing 1 and is connected with a rear side of the impeller 2.

The first path 143 is connected with the connection path 141, and is formed from the front side to the rear side of the motor housing 4. The second path 145 is formed at a rear end of the first path 143 along a thickness of the motor housing 4, and is connected with an inner side of the motor housing 4.

In addition, the circulation path 148 is provided in a rotation shaft 7 of the motor 3 to branch the air flown into the motor housing 4 to the bearings 8 at the front side through the second path 145.

The circulation path 148 is formed in the rotation shaft 7 corresponding to the bearing 8 at the front side and is connected with a hole in the rotation shaft 7, and air branched to the bearing 8 at the front side is circulated toward volute housing 1 through the circulation path 148.

Thus, air at the outlet side of the impeller 2 flows in the first path 143 through the connection path 141 and supplied into the motor housing 4 through the second path 145, and cools the motor 3 and the bearings 8 at the front and rear sides by being branched to the bearings 8 at the front and rear sides, respectively, from the inside of the motor housing 4.

In particular, the air branched to the bearing 8 at the front side is circulated to the volute housing 1 through the circulation path 148, and the air branched to the bearing 8 at the rear side is exhausted to the outside through a rear side of the motor housing 4.

Figure 4:
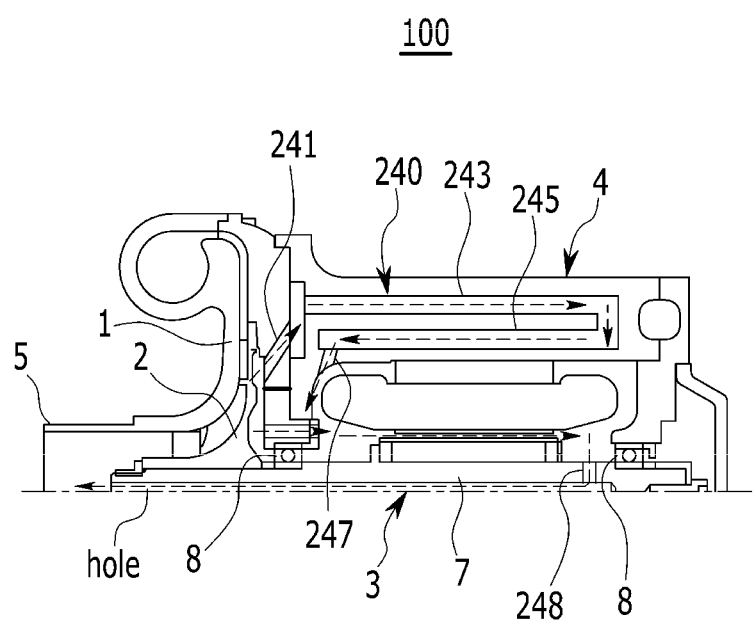
FIG. 4 is a second exemplary variation of a cooling air channel applied to the cooling unit of the air compressor according to the exemplary embodiment of the present invention.

FIG. 4 shows a second exemplary variation of the cooled air channel applied to the cooling unit of the air compressor according to the exemplary embodiment of the present invention.

Referring to FIG. 4, a cooled air channel 240 of the second exemplary variation of the exemplary embodiment of the present invention has a structure in which air at the rear side of the impeller 3 is circulated to the volute housing 1 in the motor housing 4.

Such a cooled air channel 240 includes a first connection path 241, a first path 243, a second path 245, a second connection path 247, and a circulation path 248.

The first connection path 241 is formed at a front side of the motor housing 4 coupled with the volute housing 1 and is connected with a rear side of the impeller 2.

The first path 243 is connected with the first connection path 241 and is formed from the front side to the rear side of the motor housing 4. The second path 245 is connected with a rear end of the first path 243 along a thickness direction of the motor housing 4, and is formed from the rear side to the front side of the motor housing 4.

In addition, the second connection path 247 is connected with a front end of the second path 245, and is connected with the inside of the motor housing 4.

The circulation path 248 is formed in the rotation shaft 7 to circulate air flown into the motor housing 4 to through the second connection path 247 to the volute housing 1 through the rotation shaft 7.

In particular, the circulation path 248 is formed in the rotation shaft 7 corresponding to the bearing 8 at the rear side, and is connected with a hollow space in the rotation shaft 7.

Thus, air at the outlet side of the impeller 2 is flown into the motor housing 4 while flowing along the first connection path 241, the first path 243, and the second path 245, and the second connection path 247, and is circulated toward the volute housing 1 through the circulation path 248 while sequentially cooling the bearing 8 at the front side, the motor 3, and the bearing 8 at the rear side.

Thus, the air used in cooling of the motor 3 and the bearings 8 is circulated toward the volute housing 1 through the rotation shaft 7 such that an external ventilation path for exhausting the air to the outside of the motor housing 4 can be blocked in the present exemplary variation.

Alternatively, the circulation path 248 may be formed at the other side of the rotation shaft 7 corresponding to the bearing 8 at the front side rather than being formed only at the front side of the rotation shaft 7 corresponding to the bearing 8 at the rear side.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cooling unit of an air compressor that includes a volute housing, an impeller mounted to the volute housing, and a motor driving the impeller, and cools the motor and bearings that support a rotation shaft of the motor using air at an outlet side of the impeller, the cooling unit comprising:
    a plurality of separate and distinct coolant channels arranged along a radial direction in a motor housing that is coupled to the volute housing and through which coolant flows; and
    a cooled air channel formed between and directly adjacent to at least two of the coolant channels of the motor housing and through which the air flows,
    wherein the air flowing along the cooled air channel is cooled using the coolant flowing along the coolant channels, and the motor and the bearings are cooled using the cooled air, and
    wherein the coolant channels each comprise at least one coolant path formed in an axial direction in the motor housing.

2. The cooling unit of claim 1, wherein the cooled air channel comprises:
    a first connection path formed in a front side of the motor housing coupled with the volute housing, and is connected with a rear side of the impeller;

a first path connected with the first connection path and formed in from the front side to the rear side of the motor housing;

a second path connected with a rear end of the first path and formed from a rear side to the a front side of the motor housing; and a second connection path connected with a front end of the second path and connected with the inside of the motor housing.

3. The cooling unit of the air compressor of claim 2, wherein the cooled air channel is configured to allow the air to flow into the motor housing through the first connection path, the first path, the second path, and the second connection path, and exhausts the air through a rear side of the motor housing.

4. The cooling unit of the air compressor of claim 1, wherein the cooled air channel comprises:

a connection path formed in a front side of the motor housing coupled with the volute housing, and is connected with a rear side of the impeller;

a first path connected with the connection path and formed from a front side to a rear side of the motor housing; and a second path connected to a rear end of the first path and connected with the inside of the motor housing.

5. The cooling unit of the air compressor of claim 4, wherein the cooled air channel branches the air to a bearing at a front side and a bearing at a rear side from the inside of the motor housing.

6. The cooling unit of claim 5, wherein the cooled air channel exhausts the air branched to the rear side through the rear side of the motor housing.

7. The cooling unit of claim 5, wherein a circulation path that circulates the air branched to the bearing at the front side toward the volute housing is formed in the rotation shaft.

8. The cooling unit of claim 1, wherein the cooled air channel comprises: a first connection path formed in a front side of the motor housing coupled with the volute housing, and is connected with a rear side of the impeller; a first path connected with the first connection path and formed from the front side of the motor housing to a rear side of the motor housing; a second path connected with a rear end of the first path and formed from the rear side of the motor housing to the front side of the motor housing; a second connection path connected with a front end of the second path and connected with the inside of the motor housing; and a circulation path formed in the rotation shaft and circulating the aft toward the volute housing.

9. A cooling unit of an air compressor for a fuel cell vehicle, comprising:

the air compressor including a volute housing, an impeller mounted to the volute housing, and a motor driving the impeller and cools the motor and bearings that support a rotation shaft of the motor using air at an outlet side of the impeller; and the cooling unit comprising:

a plurality of separate and distinct coolant channels provided along a radial direction in a motor housing that is coupled to the volute housing and through which coolant flows; and a cooled air channel formed between and directly adjacent to at least two of the coolant channels of the motor housing and through which the air flows, wherein the air flowing along the cooled air channel is cooled using the coolant flowing along the coolant channels, and the motor and the bearings are cooled using the cooled air, and wherein the coolant channels each comprise at least one coolant path formed in an axial direction in the motor housing.

10. A fuel cell vehicle, comprising:

an air compressor comprising a volute housing, an impeller mounted to the volute housing, and a motor driving the impeller and cools the motor and bearings that support a rotation shaft of the motor using air at an outlet side of the impeller; and a cooling unit comprising:

a plurality of separate and distinct coolant channels provided along a radial direction in a motor housing that is coupled to the volute housing and through which coolant flows; and a cooled air channel formed between and directly adjacent to at least two of the coolant channels of the motor housing and through which the air flows, wherein the air flowing along the cooled air channel is cooled using the coolant flowing along the coolant channels, and the motor and the bearings are cooled using the cooled air, and wherein the coolant channels each comprise at least one coolant path formed in an axial direction in the motor housing.

* * * * *